United States Patent
Terasaki et al.

(10) Patent No.: US 7,815,430 B2
(45) Date of Patent: Oct. 19, 2010

(54) MOLD, PRODUCTION PROCESS OF MOLD, IMPRINT APPARATUS, AND IMPRINT METHOD

(75) Inventors: Atsunori Terasaki, Kawasaki (JP); Junichi Seki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/033,078

(22) Filed: Feb. 19, 2008

(65) Prior Publication Data

US 2008/0211133 A1 Sep. 4, 2008

(30) Foreign Application Priority Data

Feb. 20, 2007 (JP) .............................. 2007-038876

(51) Int. Cl.
*A01J 21/00* (2006.01)
(52) U.S. Cl. .................. 425/385; 425/171; 425/173
(58) Field of Classification Search ................. 425/171, 425/385, 173, 174.4, 90, 98, 96; 264/293; 118/713, 608; 216/24; 427/8, 532, 271
See application file for complete search history.

(56) References Cited

U.S. PATENT DOCUMENTS

| | | | | |
|---|---|---|---|---|
| 5,426,070 A | * | 6/1995 | Shaw et al. | 216/2 |
| 5,458,985 A | * | 10/1995 | Isono et al. | 428/601 |
| 6,696,220 B2 | * | 2/2004 | Bailey et al. | 425/385 |
| 7,229,273 B2 | * | 6/2007 | Bailey et al. | 425/385 |
| 7,435,074 B2 | * | 10/2008 | Colburn et al. | 425/385 |
| 2007/0145639 A1 | | 6/2007 | Seki et al. | 264/293 |
| 2007/0176320 A1 | * | 8/2007 | Nakamura et al. | 264/219 |
| 2007/0187875 A1 | * | 8/2007 | Terasaki et al. | 264/496 |
| 2008/0047932 A1 | | 2/2008 | Terasaki et al. | 216/41 |

FOREIGN PATENT DOCUMENTS

JP  2000-323461  11/2000

OTHER PUBLICATIONS

Chou, S. et al., "Imprint of sub-25 nm vias and trenches in polymers", American Institute of Physics, Appl. Phys. Lett., vol. 67, No. 21, Nov. 20, 1995, pp. 3114-3116.

* cited by examiner

*Primary Examiner*—Joseph S Del Sole
*Assistant Examiner*—David N Brown, II
(74) *Attorney, Agent, or Firm*—Fitzpatrick, Cella, Harper & Scinto

(57) ABSTRACT

A mold for imprinting a pattern onto a resin material applied onto a substrate is constituted by a mold substrate formed of a material transparent to light in at least a part of a wavelength range of light used for alignment, an alignment structure area having an alignment structure comprising a recess portion, a pattern forming area having a pattern, and a coating layer is formed of a material having an optical characteristic different from that of the mold substrate. The coating layer is on a side wall of the recess portion.

11 Claims, 3 Drawing Sheets

MOLD, PRODUCTION PROCESS OF MOLD, IMPRINT APPARATUS, AND IMPRINT METHOD

FIELD OF THE INVENTION AND RELATED ART

The present invention relates to a mold, a production process of the mold an imprint apparatus and an alignment method.

In recent years, a fine processing technology for transferring a fine structure provided on a mold onto a member to be processed such as a resin material, a metallic material, or the like has been developed and has received attention. This technology is called nanoimprint or nanoembossing and provides processing resolving power on the order of several nanometers. For this reason, the technology is increasingly expected to be applied to a next-generation semiconductor manufacturing technology in place of a light exposure device such as a stepper, a scanner, or the like. Further, the technology is capable of effecting simultaneous processing of a three-dimensional structure at a wafer level. For this reason, the technology has been expected to be applied to a wide variety of fields as manufacturing technologies and the like for optical devices such as photonic crystal and the like, biochips such as μ-TAS (micro total analysis system), etc.

Such an imprint processing is, as described in Stephan Y. Chou et al., "Appl. Phys. Lett.", Vol. 67, Issue 21, pp. 3114-3116 (1995), performed in a manner shown below in the case where the imprint processing is applied to the semiconductor manufacturing technology.

A mold provided with a desired projection/recess pattern is pressed against a photocurable resin material layer formed on a substrate (e.g., a semiconductor wafer), followed by irradiation with ultraviolet (UV) light to cure the resin material (photoimprint). Alternatively, a thermoplastic resin material is formed on the substrate and heated to soften the resin material. The mold is pressed against the softened resin material to apply a pressure to the resin material, followed by temperature decrease to harden the resin material (thermal imprint).

As a result, the above-described pattern is transferred onto the resin material layer, so that etching or the like is performed by using the resin material layer as a mask to transfer the pattern of the mold onto the substrate.

In such an imprint technology, during the transfer of the projection/recess pattern of the mold, alignment of the mold with the substrate is an important problem.

In Japanese Laid-Open Application (JP-A) 2000-323461, the alignment of the mold with the substrate is effected in the following manner. A mark for position reference (hereinafter referred to as an "alignment structure") is provided on a mold substrate through which light or the like is passable and a mark corresponding to the alignment structure provided on the mold substrate is provided on a substrate, thereby to perform the alignment of the mold with the substrate. As a result, the light or the like is caused to pass through the mold from above the mold substrate and the alignment structure provided on the mold substrate and the alignment structure provided on the substrate are simultaneously observed and referred to effect the alignment of the mold with the substrate.

However, in the method described in JP-A 2000-323461, the alignment structure, including projections and recesses, formed on the light-transmissive mold substrate is less visible. Further, when the mold substrate contacts a resin material formed on the substrate, a difference in refractive index between the mold substrate and the resin material is small, so that the alignment structure is more unclear. For this reason, the present inventors have studied on easy observation of the mold-side alignment structure by forming, as a coating layer, a layer of a material having an optical characteristic different from that of the mold body at the surface of the mold.

However, even in the case where the layer of the mold having the optical characteristic different from that of the mold body is formed at the mold surface as the coating layer in order to facilitate the observation of the alignment structure formed on the mold substrate, the following problem arises. That is, in the case where the mold surface is coated with the mold having the different optical characteristic from that of the mold body, a film stress is exerted on the mold, so that the mold is bent.

With reference to FIG. 5, this problem is described more specifically. Referring to FIG. 5, on a surface of a mold body 5101, a coating layer 5104 is formed and onto a surface of a substrate 5201 to be processed, a resin material 5202 is applied.

As shown in FIG. 5, in the case where the coating layer 5104 formed of a mold different from that of the mold body 5101, the mold can be bent. As a result, flatness of the mold is lost, so that in-plane uniformity for imprint cannot be obtained.

SUMMARY OF THE INVENTION

In view of the above-described problems, a principal object of the present invention is to provide a mold capable of maintaining flatness of the mold and being constituted so as not to impair curing of a resin material formed on a member to be processed during imprint.

Another object of the present invention is to provide a production process of the mold, an imprint apparatus using the mold, and an imprint method using the mold.

According to an aspect of the present invention, there is provided a mold for imprinting a pattern onto a resin material applied onto a substrate, comprising:

a mold substrate formed of a material transparent to light in at least a part of a wavelength range of light used for alignment;

an alignment structure area having an alignment structure comprising a recess portion;

a pattern forming area having a pattern; and a coating layer formed of a material having an optical characteristic different from that of the mold substrate, wherein the coating layer is on a side wall of the recess portion.

By constituting the mold as described above, it is possible to provide a mold, a mold production process, an imprint (processing apparatus), and an imprint (processing) method, which are capable of maintaining flatness of the mold and being constituted so as not to impair curing of a resin material formed on a member to be processed.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, a mold according to an embodiment of the present invention will be described.

Figure 1:
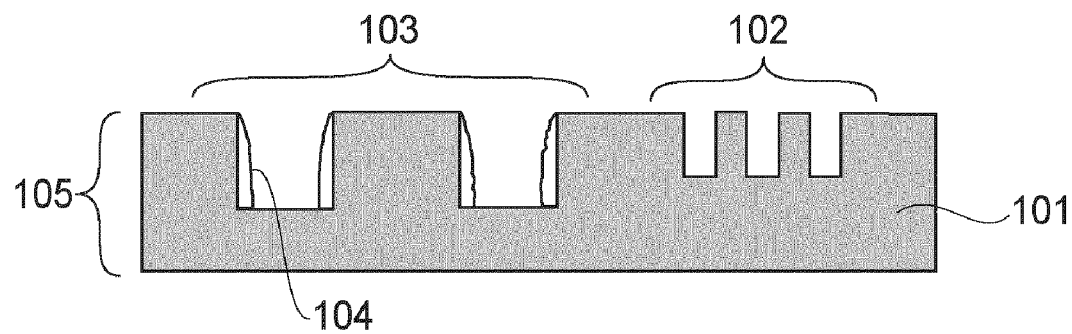
FIG. 1 is a schematic sectional view for illustrating an example of a mold in an embodiment according to the present invention.

FIG. 1 is a schematic sectional view for illustrating an example of the mold in this embodiment.

Referring to FIG. 1, a mold 105 includes a mold body 101, a pattern forming area 102 having a pattern constituted by a recess portion and a projection portion, an alignment structure area 103 having a recess portion and a projection portion, and a coating layer 104.

In this embodiment, the mold body 101 is constituted by a material transparent to light in at least a part of a wavelength range (region) of light used for alignment.

Generally, the light used for alignment may include visible light (in a wavelength range from 380 nm to 780 nm) such as light with a wavelength of 633 nm.

The material transparent to the light means a material having a transmittance of 50% or more, preferably 70% or more, more preferably 90% or more.

At the surface of the mold body 101, the alignment structure area 103 having an alignment structure constituted by the recess portion and the projection portion and the pattern forming area 102 having the pattern constituted by the recess portion and the projection portion. A depth (height) of the recess portion in the pattern forming area 102 and a depth (height) of the recess portion in the alignment structure area 103 may be identical to or different from each other.

With respect to the mold, on a side wall of the recess portion constituting the alignment structure, the coating layer 104 is formed.

The coating layer 104 is formed of a material selected from materials having an optical characteristic different from that of the mold body 101. Herein, the material having the different optical characteristic means a material capable of providing a discriminable difference in optical characteristic with respect to light in at least a part of a wavelength range of light used for alignment. The optical characteristic is any one of a refractive index, a transmittance, and a reflectance, particularly the refractive index.

As described above, the coating layer 104 has an optical characteristic different from that of the mold body 101, so that the alignment structure on the mold can be easily recognized. Further, the coating layer 104 is provided on the side wall of the recess portion and thus is not provided at the projection portion, so that it is possible to prevent bending of the coating layer 104 due to stress.

The coating layer 104 may also be formed of a material having an optical characteristic different from that of the resin material applied onto the substrate. By this constitution, it is possible to easily recognize the alignment structure even in the case where a difference in refractive index between the mold body 101 and the resin material to result in a less visible alignment structure.

In the case where the mold is used for photoimprint, the mold body 101 may also be constituted by a material transparent to light in at least a par of light used for curing the resin material. The light used for curing the resin material may be UV light (in a wavelength range from 10 nm to 400 nm) such as light with a wavelength of 365 nm. The material transparent to the light may, e.g., be a material having a transmittance of 50% or more, preferably 70% or more, more preferably 90% or more.

The material for the mold body 101 can be selected from, e.g., silicon oxide, aluminum oxide, calcium fluoride, silicon nitride, titanium oxide, indium tin oxide (ITO), zinc oxide, and the like.

Further, as the material for the coating layer 104, it is possible to select a material, different in optical characteristic from the material for the mold body 101, from, e.g., silicon oxide, aluminum oxide, calcium fluoride, silicon nitride, titanium oxide, indium tin oxide (ITO), zinc oxides, and the like. As the material for the coating layer 104, it is also possible to use a material, which is not transparent to light used for curing the resin material, such as metal, silicon, silicon carbide, or the like.

Embodiment

In this embodiment, a mold provided with a coating layer constituted by a material having an optical characteristic different from that of a resin material applied onto a substrate will be described specifically.

Figure 2:
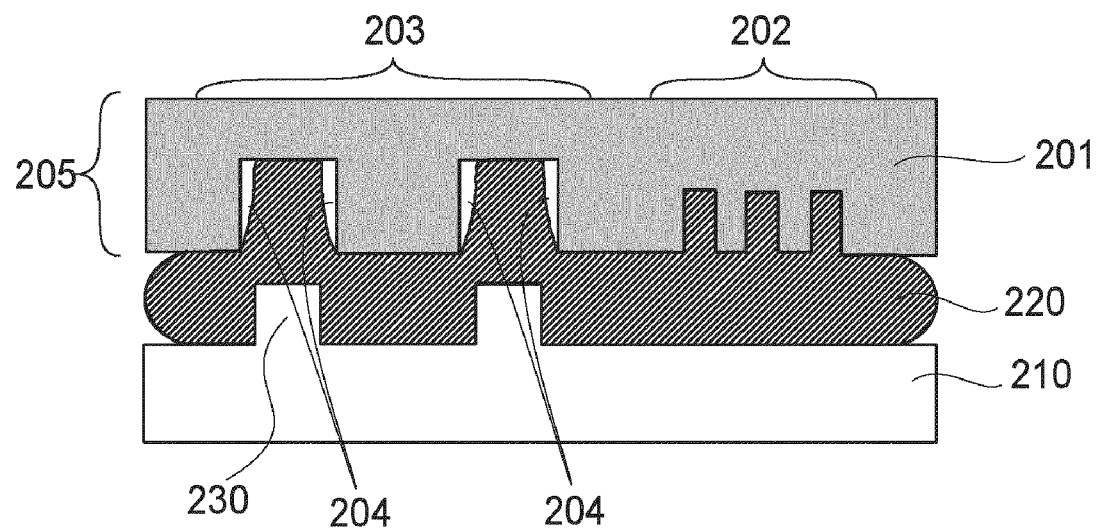
FIG. 2 is a schematic sectional view for illustrating a mold and an alignment method of the mold with a substrate in an embodiment of the present invention.

Referring to FIG. 2, a mold 205 includes a mold body 201, a pattern forming area 202 having a pattern constituted by a recess portion and a projection portion, an alignment structure area 203 having a recess portion and a projection portion, and a coating layer 204. Further, a substrate 210 is provided with an alignment structure 230 and onto the substrate 210, a resin material 220 is applied.

As a combination of the mold body 101 and the coating layer 204, it is possible to employ the mold body 101 formed of silicon oxide and the coating layer formed of silicon nitride. That is, silicon nitride as the material for the coating layer 204 is a material having a refractive index different from that of the resin material 220. For this reason, the coating layer 204 formed on a side wall of the recess portion in the alignment structure area 203 can be observed even after the recess portion of the mold 205 is filled with the resin material 220. The coating layer 204 is formed depending on a depth (height) of the recess portion in the alignment structure area, so that it is possible to adjust the depth of the recess portion in the alignment structure area so as to obtain a sufficient contrast. For example, in the case where the coating layer 204 is formed on an opaque material, a larger film (layer) thickness thereof provides a larger degree of a light blocking effect, so that a difference in contrast can be increased.

In the case where a material transparent to light in a wavelength range of light used for alignment is used as the material for the coating layer 204, a film thickness affects an optical path difference. For this reason, by changing the film thickness to adjust the optical path difference, it is possible to obtain an optimum difference in contrast under a light interference condition.

The coating layer 204 is formed on the side wall in the alignment structure area 203, so that the coating layer 204 hardly disturbs observation of the alignment structure 230 on the substrate 210.

Further, the case where the mold in this embodiment is used for photoimprint, it is possible to sufficiently irradiate even a portion immediately under the coating layer 204 with UV light used for curing the resin material by diffraction from a circumferential portion. Accordingly, even when a material which is not transparent to the UV light is used for the coating layer 204, the coating layer 204 does not higher the curing of the resin material.

Next, a production process of a mold in this embodiment will be described.

FIGS. 3(a) to 3(e) and FIG. 4 are schematic sectional views for illustrating an example of the production process of the mold shown in FIG. 2 in this embodiment.

Figure 3:
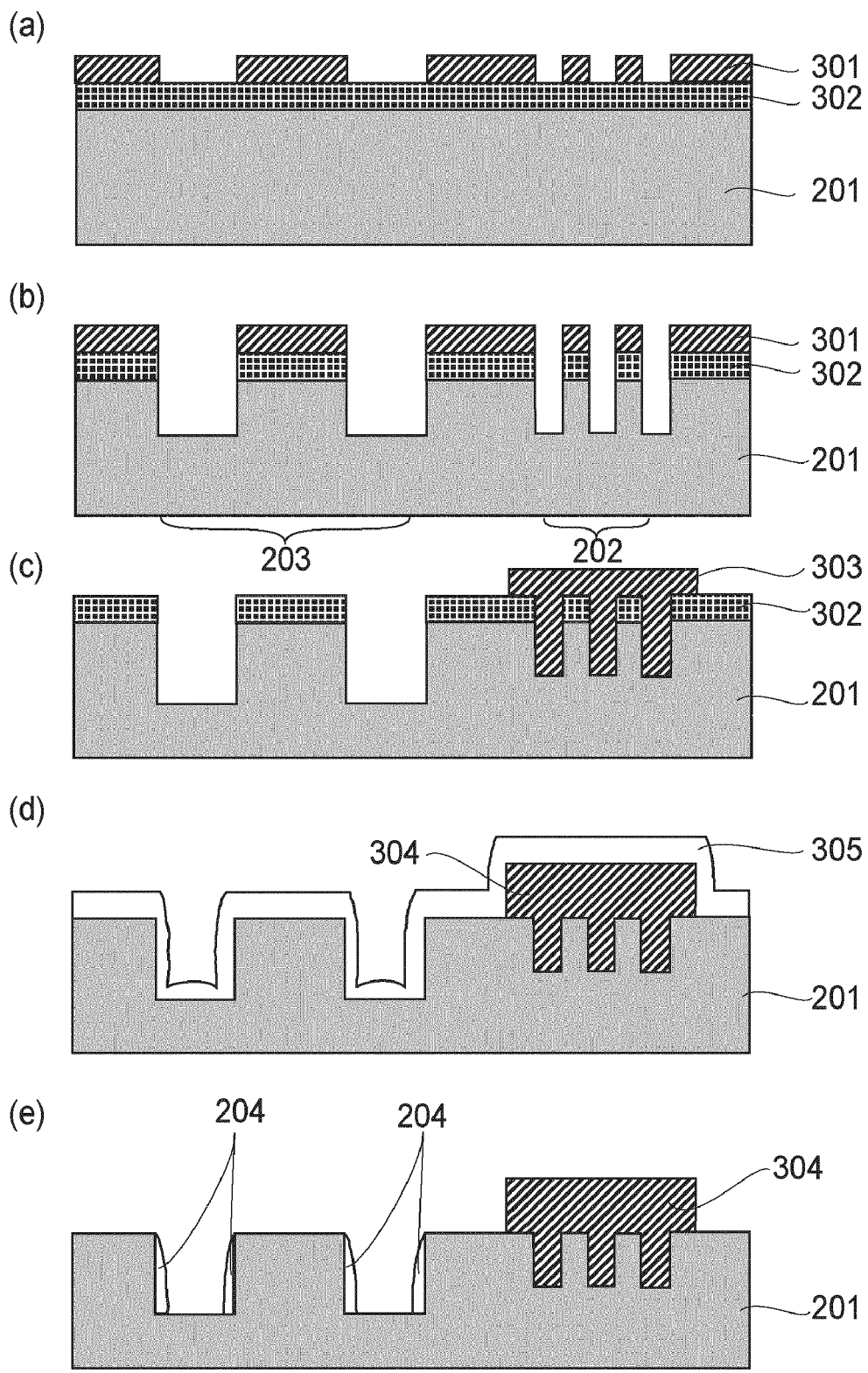
FIGS. 3(a) to 3(e) are schematic sectional views for illustrating an example of a production process of the mold in the embodiment of the present invention.
Figure 4:
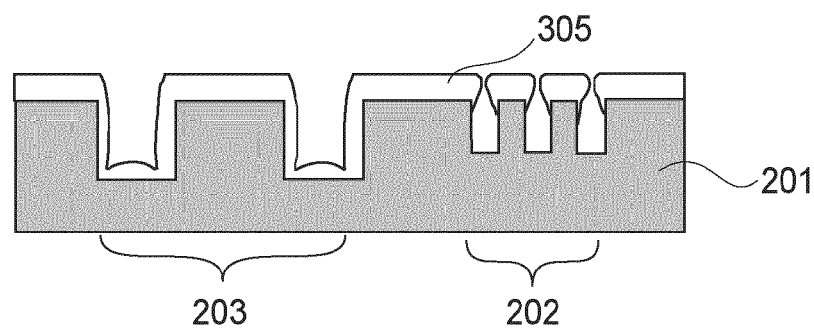
FIG. 4 is a schematic sectional view for illustrating an example of a production process of the mold in the embodiment of the present invention.
Figure 5:
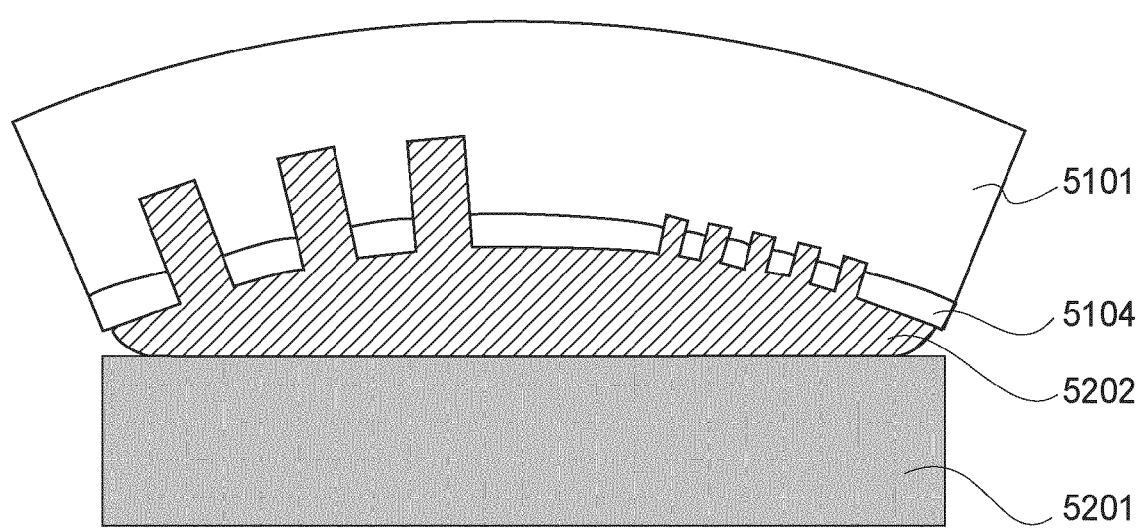
FIG. 5 is a schematic sectional view for illustrating a mold in a conventional production process.

In FIGS. 3 and 4, constitutional members identical to those for the mold shown in FIG. 2 are represented by the same reference numerals, so that redundant description thereof is omitted. In FIGS. 3 and 4, reference numerals 301 to 305 represents a resist, a hard mask layer, a mask, and a coating layer, respectively.

(1) First, at a surface of the mold body 201, the hard mask layer 302 is formed and thereafter a mask is formed with the resist 301 (FIG. 3(a)). It is also possible to directly provide the resist 301 on the mold body 201. The mask is used for forming the pattern forming area 102 and the alignment structure area 103. As a patterning method, it is possible to employ, e.g., light exposure lithography or electron beam lithography by a stepper, a scanner, or the like.

(2) By using the resist 301 as the mask, the mold body 201 is etched (FIG. 3(b)). In the case of using the hard mask layer 302, it is also possible to etch the mold body 201 by using the resist 301 and the hard mask layer 302 in combination as the mask or using the hard mask layer 302 as the mask after the resist 301 is removed.

After the etching, the resist 301 is removed. The hard mask layer 302 is removed as desired.

(3) In the case where an etching depth in the pattern forming area 202 and the alignment structure area 203 is intended to be changed, one of these areas is coated with the mask 303 and the other area is additionally etched through the hard mask layer 302 as a mask (FIG. 3(e)). Thereafter, the mask 303 and the hard mask layer 304 are removed.

(4) The pattern forming area 202 is coated with the mask 304. Then, the coating layer 305 is formed (FIG. 3(d)). The coating layer 305 is formed by CVD, sputtering, EB deposition, spin coating, etc. It is desirable that a method capable of uniformly forming a film both on the surface and side walls is used.

(5) The coating layer 305 is subjected to whole surface etching through anisotropic etching. By this etching, with respect to an etching direction (perpendicular to the mold surface), the coating layer 204 is formed in a large thickness (FIG. 3(e)). An upper and of the coating layer 204 is rounded by removing a corner.

In this embodiment, when the coating layer 305 is removed, the anisotropic etching is used but the method for removing the coating layer 305 is not limited to the anisotropic etching. Other than the anisotropic etching, it is also possible to employ planarization or a combination of the planarization with the anisotropic etching so as to remove the coating layer formed on the bottom of the recess portion of the alignment structure and on the projection portion of the alignment structure.

(6) Finally, the mask 304 is removed.

Through the above-described process, it is possible to produce the mold 205 of this embodiment.

This production process can also be used for the purpose of adjusting an opening dimension (opening width) of the pattern. In this case, the mold body 201 and the coating layer 204 may be formed of the same material. Further, depending on a film-forming condition of the coating layer 305, as shown in FIG. 4, the material little enters the inside of a minute pattern and thus is not formed in a film in some cases.

In the case where the coating layer 305 is not formed at the recess portion of the pattern in the pattern forming area 202 but is formed at the recess portion in the alignment structure area, it is possible to finally prepare the mold 205 of this embodiment without using the mask 304 in the step shown in FIG. 3(d).

Incidentally, the mold of this embodiment can be used for not only the photoimprint but also thermal imprint. Further, alignment is effected by using the mold of this embodiment, so that it is possible to produce a structure such as a photonic crystal device or a semiconductor device.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 038876/2007 filed Feb. 20, 2007, which is hereby incorporated by reference.

What is claimed is:

1. A mold for imprinting a pattern onto a resin material applied onto a substrate, comprising:
   a mold substrate formed of a material transparent to light in at least a part of a wavelength range of light used for alignment;
   an alignment structure area having an alignment structure comprising the following portions of said mold substrate: two spaced apart top projection surfaces; a bottom surface below said top projection surfaces and extending between the top projection surfaces; and two side walls each extending from different top projection surfaces to the bottom surface, wherein the spaced apart top projection surfaces, the side walls, and the bottom surface together define a recess portion of the mold substrate;
   a pattern forming area having a pattern; and
   a coating layer formed of a material having an optical characteristic different from that of the mold substrate, wherein the coating layer is on side walls of the recess portion of the mold substrate but is not on the spaced apart top projection surfaces of the recess portion of the mold substrate.

2. A mold according to claim 1, wherein the coating layer is formed of the material having the optical characteristic different from that of the resin material.

3. A mold according to claim 1, wherein the light used for alignment is visible light.

4. A mold according to claim 1, wherein the coating layer is formed of the material transparent to light used for curing the resin material.

5. A mold according to claim 4, wherein the light used for curing the resin material is ultraviolet light.

6. A mold according to claim 1, wherein the coating layer is formed of a material selected from the group consisting of silicon oxide, aluminum oxide, calcium fluoride, silicon nitride, titanium oxide, indium tin oxide, and zinc oxide.

7. A mold according to claim 1, wherein the coating layer is formed of a material selected from the group consisting of metal, silicon, and silicon carbide.

8. A mold according to claim 1, wherein the recess portion in said alignment structure area has a depth different from a recess portion in said pattern forming area.

9. An imprint apparatus comprising:
   a mold, according to claim 1, as a mold for imprinting a pattern onto a resin material formed on a substrate, wherein alignment is effected by the alignment structure of said mold.

10. An imprint method comprising:

preparing a mold, according to claim 1, as a mold for imprinting a pattern onto a resin material formed on a substrate; and effecting alignment by the alignment structure of the mold.

11. A mold for imprinting a pattern onto a resin material applied onto a substrate, comprising:

a mold substrate formed of a material transparent to light in at least a part of a wavelength range of light used for alignment;

an alignment structure area having an alignment structure comprising the following portions of said mold substrate: two spaced apart top projection surfaces; a bottom surface below said top projection surfaces and extending between the top projection surfaces; and two side walls each extending from different top projection surfaces to the bottom surface, wherein the spaced apart top projection surfaces, the side walls, and the bottom surface together define a recess portion of the mold substrate;

a pattern forming area having a pattern; and a coating layer formed of a material having an optical characteristic different from that of the mold substrate, wherein the coating layer is on side walls of the recess portion of the mold substrate but is not on the spaced apart top projection surfaces and the bottom surface of the recess portion of the mold substrate.

* * * * *